(No Model.)　　　　　　　　　L. W. LEEDS.　　　　2 Sheets—Sheet 1.
BREAKWATER.
No. 335,032.　　　　　　　　　　　Patented Jan. 26, 1886.
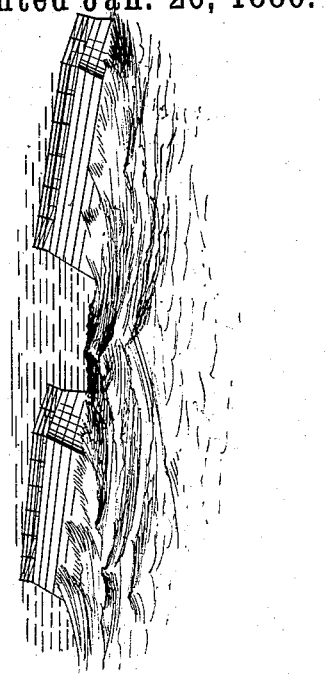
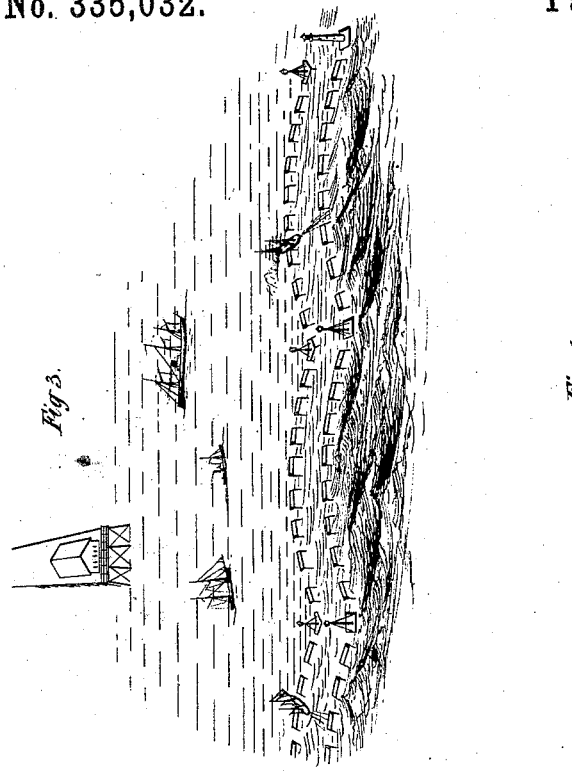
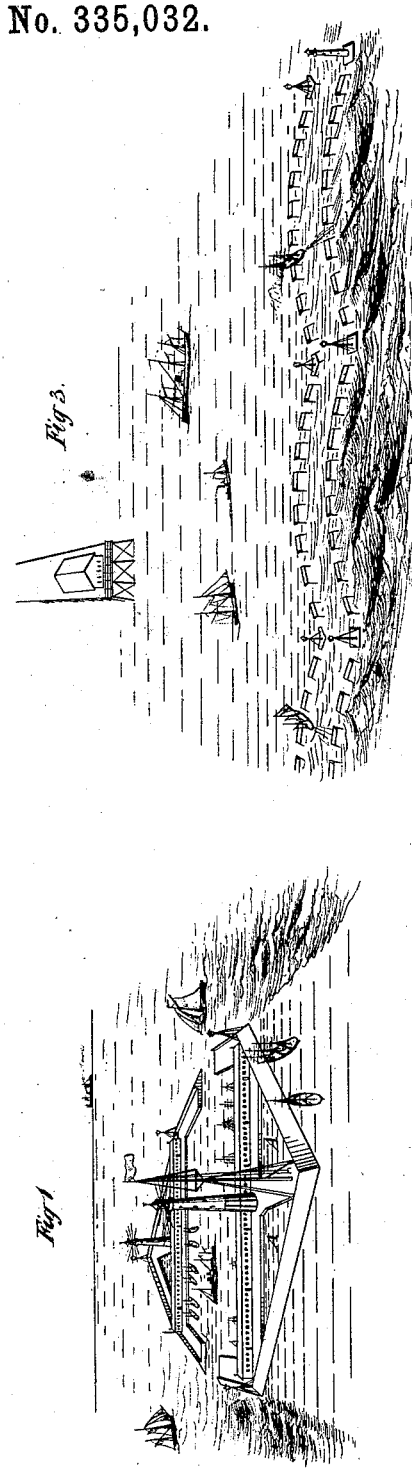
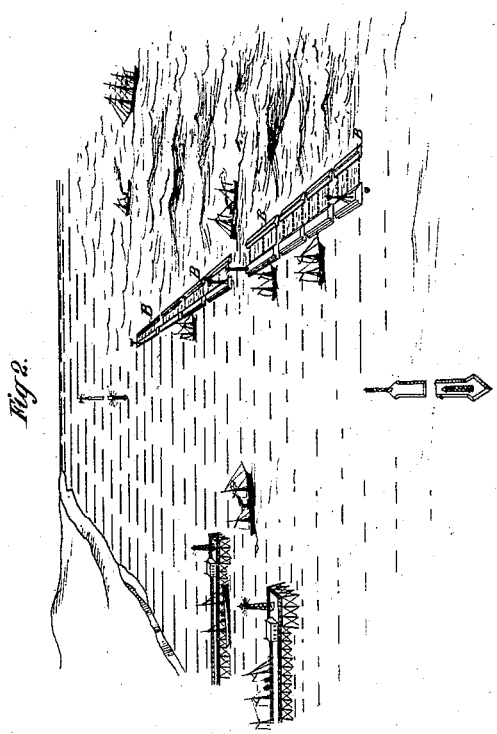
WITNESSES.　　　　　　　　　　　INVENTOR.
F. L. Middleton　　　　　　　　　　Lewis W. Leeds
A. E. Middleton　　　　　　　　　　by Joyce & Spear
　　　　　　　　　　　　　　　　　　　Attys

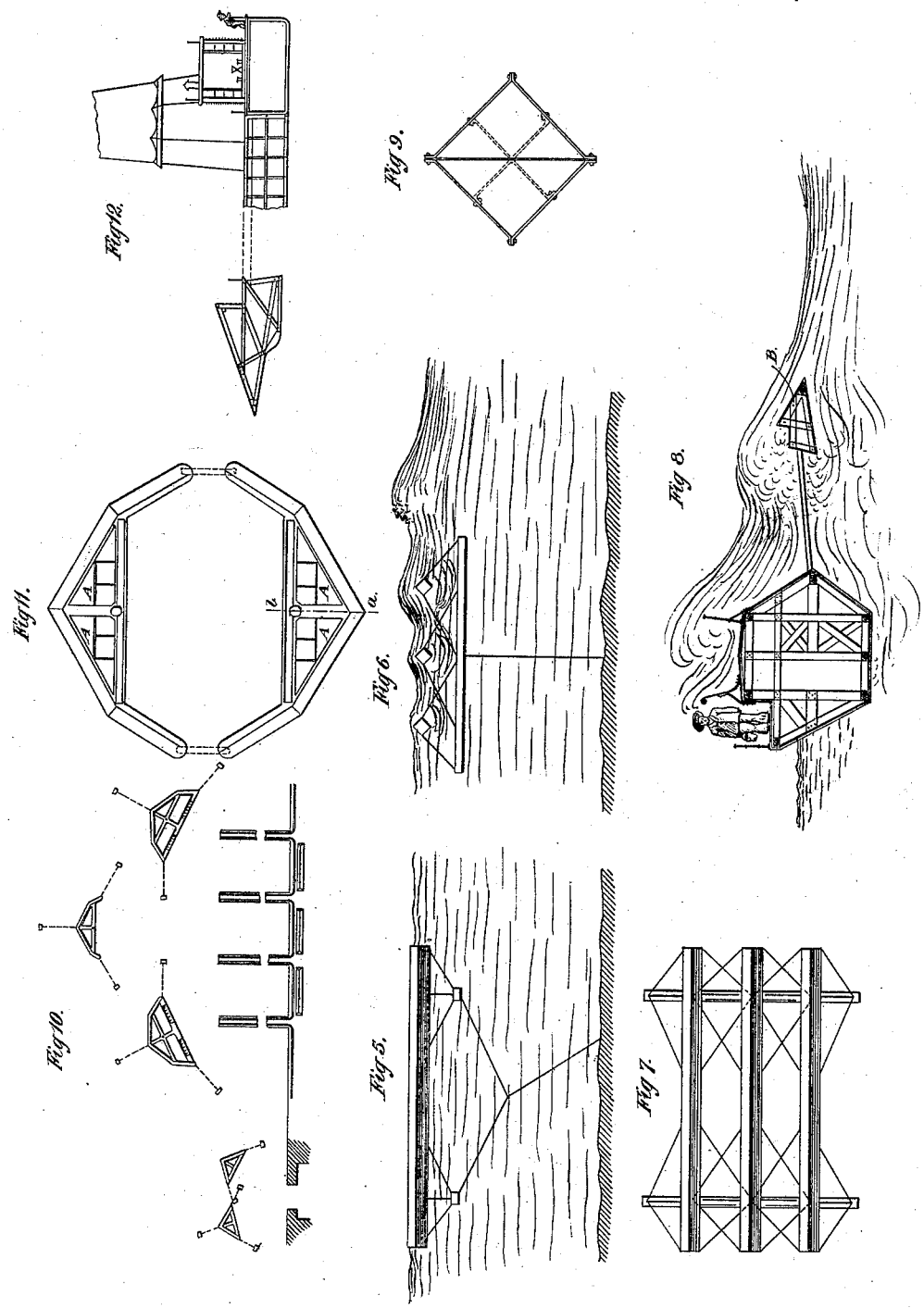

UNITED STATES PATENT OFFICE.

LEWIS W. LEEDS, OF LONDON, ENGLAND.

BREAKWATER.

SPECIFICATION forming part of Letters Patent No. 335,032, dated January 26, 1886.

Application filed July 2, 1885. Serial No. 170,522. (No model.) Patented in France May 25, 1883, No. 155,667; in Belgium May 25, 1883, No. 61,487; in England November 12, 1883, No. 5,336, and in Italy June 27, 1884, XVIII, 16,986.

*To all whom it may concern:*

Be it known that I, LEWIS WALKER LEEDS, a citizen of the United States, residing at Old Jewry, in the city of London, England, have invented a certain new and useful Improvement in Breakwaters and Harbors of Refuge, (for which I have obtained Letters Patent in Great Britain, No. 5,336, dated November 12, 1883; in France No. 155,667, dated May 25, 1883; in Belgium No. 61,487, dated May 25, 1883, and in Italy, dated June 27, 1884, Vol. XVIII, No. 16,986,) of which the following is a specification.

This invention relates to a novel construction and arrangement of floating structures to act as breakwaters, more particularly at the entrance of harbors, but is also especially useful in the construction of floating harbors of refuge for fishing fleets and other vessels, also for protecting light-houses and life-boats, and for other analogous purposes.

These improved breakwaters are of peculiar form and construction, and are so arranged with irregular angles, made expressly to destroy the continuous motion of the waves, that the breakwater remains comparatively motionless even in a rough sea. The structure is formed of iron or wood, or a combination of the two, and is anchored or secured so that the waves which strike it are cut or broken up, part going up the horizontally-inclined plane and passing over the structure, and part passing under the inclined under surface.

To clearly explain my invention, reference is made to the accompanying drawings, which form part of this specification, Figure 1 representing in perspective, a floating harbor of refuge, as hereinafter described; Figs. 2 and 3 representing also in perspective the floating breakwaters as anchored off landing-piers. Figs. 4, 5, 6, 7, 8, and 9 represent some of the forms of floating breakwaters which I deem useful. Fig. 10 represents a plan of a series of sections of breakwaters anchored off landing-piers or dock-entrances. Fig. 11 may be taken roughly as a plan of Fig. 1, and Fig. 12 as a section on line $a\ b$, Fig. 11; but various other forms may be employed, so long as they have the essential features of a floating structure provided with a horizontal share or cut-water.

The cut-water lies slightly below the average surface of the water-level. The under current gives an increased buoyancy to the structure and partially compensates for the increased weight thrown upon the structure by the wave mounting the inclined surface. The effect of thus causing the water to pass over and under this structure is to break up the continuity of the waves, which by partly falling over and expending their energy on a rear platform, and also by partly passing round the lower inner angle, and then meeting the other portion at the back of the structure at different angles cause a comparative stillness of the water to be produced behind the structure. This form is clearly shown in Figs. 1, 2, and 12. This special form contains within itself the floating power, and also offers the least possible resistance to the motion of the waves in producing the desired result. For this reason it can be held in position in a violent storm more readily than structures which are designed to destroy the motion of the waves by the disintegration or breaking up thereof. The latter offer such great resistance that they are liable to be carried away.

For the formation of harbors of refuge, these structures may be variously arranged in large or small sections, according to circumstances, so as to form a square, octagon, triangle, or other shape. (See Figs. 1, 10, and 11.) Harbors so constructed are intended to be firmly anchored out at sea in two or more parts, but connected together beneath the entrances, so as to inclose a space between the said structures which will afford protection for fishing fleets and for shipping generally. It will be obvious that such a large floating-surface might be utilized for many useful purposes. For instance, the second or cross pontons which serve to give rigidity to the structure and also to increase the buoyancy, as well as the further destruction of the wave motion, may have erected upon them fishermen's huts or quarters. Small light-houses may be also erected thereon, while suitable inclosed spaces may be adapted to the wells A A to form pens or tanks for the reception of live fish.

The construction of floating harbors also affords facility for telegraphic communication with the shore and with other harbors.

Instead of inclosing a space, as hereinbefore described, it will be obvious that one section of the floating structure might be used and be anchored by its apex by a single anchor, and thus the structure would be free to swing round and follow the wind, and so afford protection behind it for vessels in all weather. A series of these structures made straight, curved, or angular if strung together or otherwise connected, may be anchored before the entrances to harbors, and, if found necessary, one or more preliminary cut-waters, B, may be employed to partially break the force of the waves before they reach the main or inner structure.

A modification of my invention consists of a series of floating vessels linked together by a submerged cable, and this connecting-cable anchored at long intervals, or a series of vessels of smaller diameter anchored parallel to the motion of the waves. These vessels may be made water-tight, or, if made of wood or of some floating material, the water may have free access. One or more in each series of these vessels may have their upper parts filled with oil, &c., which floats upon the water contained inside such vessels, and in case of a turbulent sea gently oozes out through apertures at or near the top, and so assists by its lubricating action in breaking up the waves passing over such vessels.

The series of small parallel vessels may be fastened together rigidly, so as to move as a single structure, or, preferably, each vessel should be fastened by pliable wire or rope to one or more steadying-logs or bracings placed at a considerable distance beneath the surface of the water.

This form of breakwater is represented in Figs. 5, 6, and 7, while Fig. 9 shows in section a convenient way of forming such vessels of a series of iron plates.

I am aware that it has been proposed to use floating structures for neutralizing the motion of the waves, and also to construct such structures of slats and screens, and I do not broadly claim such as my invention; but What I do claim, and desire to secure by Letters Patent, is—

The improved breakwater hereinbefore set forth, consisting of the floating structure provided with a cut-water having plain faces inclined upward and downward throughout the whole extent of the said structure, whereby the waves are cut or broken, a part passing under and part over the structure unobstructedly, substantially as and for the purpose set forth.

In testimony whereof I have hereunto set my hand in the presence of two subscribing witnesses.

LEWIS W. LEEDS.

Witnesses:
PHILIP M. JUSTICE,
ALLEN P. JONES.